F. S. SHIRLEY & F. RHIND.
Jar and Can.
No. 223,013.   Patented Dec. 30, 1879.
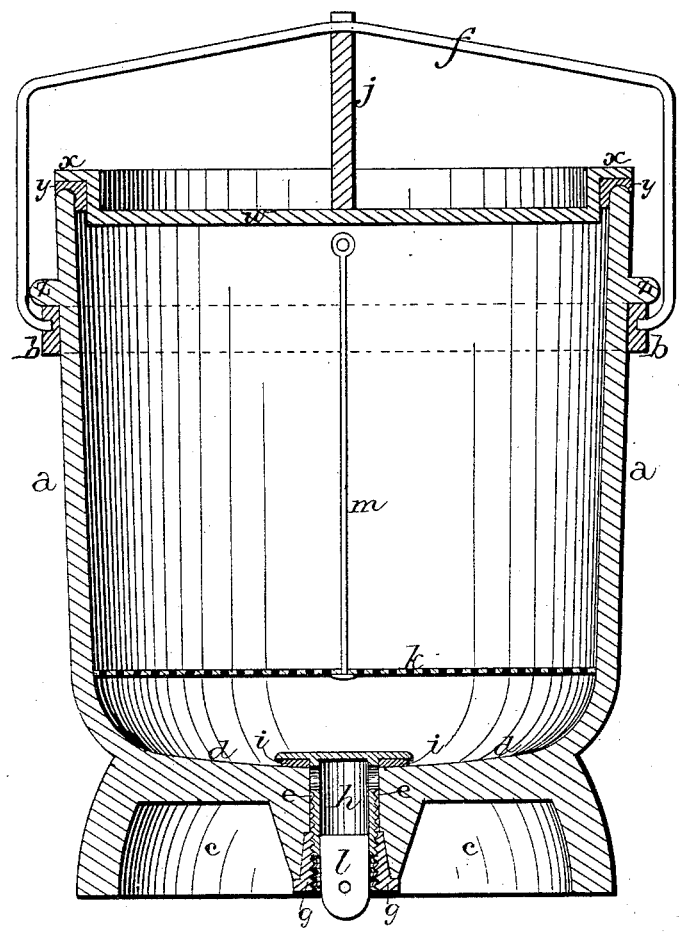
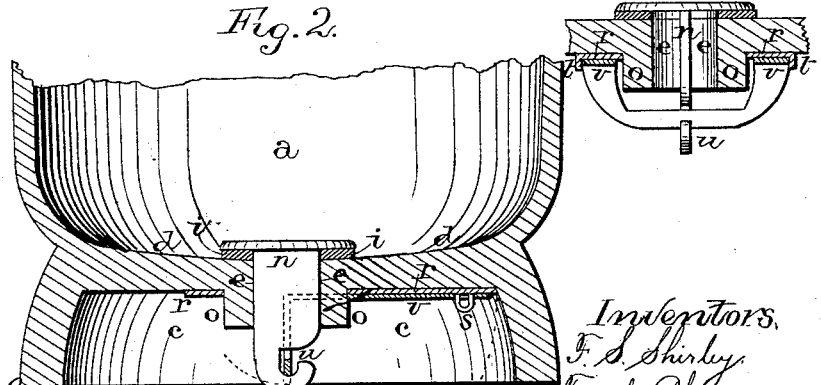
Witnesses
J. W. Garner
Wm. W. Mortimer
Inventors,
F. S. Shirley,
Frank Rhind,
per
F. A. Lehmann, atty

UNITED STATES PATENT OFFICE.

FREDERICK S. SHIRLEY, OF NEW BEDFORD, MASSACHUSETTS, AND FRANK RHIND, OF BROOKLYN, NEW YORK.

IMPROVEMENT IN JARS AND CANS.

Specification forming part of Letters Patent No. 223,013, dated December 30, 1879; application filed November 3, 1879.

*To all whom it may concern:*

Be it known that we, F. S. SHIRLEY, of New Bedford, in the county of Bristol and State of Massachusetts, and FRANK RHIND, of Brooklyn, in the county of Kings and State of New York, have invented certain new and useful Improvements in Jars or Vessels for Milk, &c.; and we do hereby declare the following to be a full, clear, and exact description of the invention, such as will enable others skilled in the art to which it pertains to make and use it, reference being had to the accompanying drawings, which form part of this specification.

Our invention relates to an improvement in jars and cans; and it consists in the peculiar construction of parts, that will be more fully described hereinafter, whereby all air is excluded from the jar, and a portion of the contents of the jar drawn off through the bottom without disturbing any of the contents on top.

Figure 1 is a vertical section of our invention. Figs. 2 and 3 are similar views of a jar with a different form of plug through its bottom.

$a$ represents a suitable jar or can, which is made of glass or other suitable material, and which has a suitable recess, $c$, made in its lower end. The bottom $d$ of this jar is made rounding at the edge and up toward the hole or opening $e$ through its center, so that after the jar has been filled and the cover clamped on, when the jar is turned upside down, every particle of air will rise at once to this opening $e$ and escape as soon as the plug which closes it is opened. Different forms of plugs may be used for stopping this opening $e$, as is shown in Figs. 1 and 2. In Fig. 1 a screw-collar, $g$, is inserted in the opening, and then a hollow screw-plug, $h$, having openings in its sides, is inserted from the opposite side of the opening and screwed tightly into the collar by means of an extension, $l$, which projects from the end of the plug down far enough below the bottom of the jar to enable it to be readily taken hold of. When this plug is screwed down tightly into place the packings $i$ form a tight joint; but when the plug is loosened all the air in the jar, after it has been turned upside down, can escape, or a portion of the contents of the jar can be drawn off without disturbing the upper part.

The plug $n$ (shown in Figs. 2 and 3) consists of a flat plate which rests on the bottom of the jar and a flat plate extending at right angles thereto and projecting through the opening.

Around the opening is formed a flange, $o$, and over this flange is fitted a plate, $r$, which has a staple, $s$, projecting from it, and its two side edges turned up so as to form flanges $t$, to keep the plate $v$ straight. This plate $v$ has its inner end turned up at right angles, and catches in the hook $u$ on the plug, for the purpose of drawing the plug so tightly into place that it will form a tight joint. The outer end of this plate passes down over the staple, so that a catch can be used to hold the plate against accidental displacement; or a lock and key can be used where greater security is required.

Other forms of plugs than those described may be used and the same result obtained.

The cover $w$ is recessed on top, as shown, and has a flange, $x$, all around its edge sufficiently wide to extend out over the top of the jar, where a tight joint is formed by means of the gasket $y$.

Around the outside of the jar, at a suitable distance below its top edge, is formed a strong flange, $z$, under which catches a metallic ring, $b$, to which the bail $f$ is fastened. This ring may be either slipped over the jar from below after it is finished, or it may be placed in the mold and have the jar formed inside of it. A flat piece of wood or metal, $j$, is placed on top of the cover $w$ and under the bail, and serves to hold the cover securely in place, which cover may be made of iron or any other suitable material which will not be easily broken.

This jar is intended to be used especially for milk; and in order to draw off the milk without in any manner disturbing the cream, and to let every particle of air escape, the opening is made through its bottom.

In order to prevent the cream from passing off with the milk, a fine gauze screen, $k$, which is provided with the handle $m$, is placed in the jar, as shown in Fig. 1. As the cream descends to this screen it settles upon it without passing through it, when the cream can be lifted out of the jar.

Having thus described our invention, we claim—

1. The combination of the milk jar or vessel $a$, having an opening through its bottom to draw off the milk, with the strainer $k$, provided with the handle $m$, the strainer being about the size of the interior of the vessel, whereby the milk can be drawn off and the cream left behind upon the strainer, and then lifted out of the jar in a mass, substantially as described.

2. The combination of the milk jar or vessel having an opening, $e$, through its bottom, and having a rounded bottom on its inside, with the strainer $k$, provided with the handle $m$, the rounded bottom forming a support for the strainer, so that the milk can drain freely from under it, substantially as set forth.

3. In combination with a jar or milk-vessel having an opening through its bottom, a plug having a hook, $u$, on its lower end, with the bent plate $v$ and plate $r$, the parts being arranged to operate substantially as shown.

In testimony that we claim the foregoing we have hereunto set our hands this 7th day of August, 1879.

FREDK. S. SHIRLEY.
FRANK RHIND.

Witnesses to signature of Frank Rhind:
GEO. N. ALDEN,
JOS. TILLINGHAST.

Witnesses to signature of F. S. Shirley:
JAS. E. CARPENTER,
O. G. MCCALL.